United States Patent [19]

Benado

[11] Patent Number: 5,041,245

[45] Date of Patent: Aug. 20, 1991

[54] CONTINUOUS EXTRACTION OF OIL-CONTAINING VEGETABLE MATTER WITH PRESSURIZED NORMALLY GASEOUS SOLVENT

[75] Inventor: Adam L. Benado, Lansing, N.Y.

[73] Assignee: Bioseparations, Inc., Ithica, N.Y.

[21] Appl. No.: 321,637

[22] Filed: Mar. 10, 1989

[51] Int. Cl.$^5$ .............................. C09F 5/02; C11B 1/00
[52] U.S. Cl. .................................. 260/412.1; 260/412; 260/428
[58] Field of Search .................. 260/412, 412.4, 412.8, 260/428

[56] References Cited

U.S. PATENT DOCUMENTS

| 3,565,634 | 8/1967 | Osterman | 260/412 |
| 4,675,133 | 6/1987 | Eggers et al. | 260/412.4 |
| 4,744,926 | 5/1988 | Rice | 260/412 |

Primary Examiner—José G. Dees
Assistant Examiner—Deborah D. Carr
Attorney, Agent, or Firm—Mason, Fenwick & Lawrence

[57] ABSTRACT

The oil in comminuted oil-containing vegetable matter is extracted by passing the vegetable matter through a closed extraction zone in contact preferably in countercurrent flow relation with a liquid extraction medium, which is a normally gaseous hydrocarbon, preferably propane, under a pressure sufficient to liquify the same up to about 250 psi, a temperature from about room temperature up to about 40°–50° C. and in sufficient volume to extract substantially the oil from such matter, e.g., a solvent feed ratio of about 1–3:1 by weight, the vegetable matter being continuously introduced into the zone by the steps comprising: advancing said vegetable matter through an elongated tubular screw-feeding stage communicating at its discharge end with one end of said extraction zone, subjecting said vegetable matter while within said screw-feeding stage to compacting pressure to create a region of compacted matter, and introducing under pressure into the compacted region a discrete innocuous normally liquid sealing medium which if different from said oil is capable of being at least substantially separated from the extracted oil, in an amount up to about 10% by weight of such matter which is effective to form the matter when compacted into a generally plastic mass, the magnitude of said compacting pressure in the absence of said medium being insufficient either to express said oil directly from said matter or densify said matter to a solid density capable of containing the pressure in the extraction zone. The preferred sealing medium upstream of the extraction zone is a recycled fraction of the extracted oil, and preferably a similar compaction zone is created in a screw-feeding stage at the discharge end of the extraction zone. The solvent and extracted oil are separated and recovered, the solvent being recycled for further extraction. The solid residue is freed of solvent and is useful, e.g., as defatted bran or meal. Preferably, the solvent-oil mixture after removal from the zone is subjected to a phase separation by raising its temperature and pressure to recover a liquid solvent phase containing a small amount of oil which can be reused as a solvent and an oil-enriched phase that can be freed of solvent by controlled volatilization. The solid residue is preferably freed of solvent by reducing the pressure thereon in at least two stages with heating, the solvent vapors being removed separately and compressed for recycling and reuse.

31 Claims, 1 Drawing Sheet

CONTINUOUS EXTRACTION OF OIL-CONTAINING VEGETABLE MATTER WITH PRESSURIZED NORMALLY GASEOUS SOLVENT

FIELD OF THE INVENTION

This invention relates to the solvent extraction of the oil content of oil-containing vegetable matter and is especially concerned with an efficient continuous process for effecting such extraction by means of a normally gaseous hydrocarbon solvent maintained in liquified condition under pressure.

BACKGROUND OF THE INVENTION

It is well known that many kinds of vegetable material in varying amounts contain oil, i.e., liquid triglycerides, which can be extracted as a valuable commodity, and numerous processes aimed at such extraction have been proposed. Many vegetable seeds contain a significant quantity of oil, such as soybeans, castor beans and cottonseeds. In some instances the oil is essentially present in a specific constituent, such as the germ or a covering layer or sheath known as bran, as in the cereals, the bran of rice being especially high in oil. This covering or bran is removed during the initial milling operations of the cereal grains as, for instance, in the case of rice, in the conversion of so-called brown rice to white or polished rice, the exterior brown layer thus-removed being recovered as so-called rice bran. Rice bran oil has for many years been extracted from rice bran and is valued as a cooking or frying oil, particularly in Oriental cultures. The oil-free or defatted bran residue resulting from such extraction has up to now possessed only limited value as a commodity but is presently being evaluated as a desirable bulk or natural fiber material for human ingestion with possible medicinal benefits in reducing serum cholesterol levels.

Of the many extraction processes heretofore proposed, most employ a normally liquid solvent for the oil, of which hexane is the most common example. Hexane is a liquid at ambient temperature and pressure so that the extraction can be carried out without pressurization at ambient or higher temperature. With the extraction vessel under normal atmospheric pressure, the introduction and removal of the raw vegetable matter into the extraction vessel can be readily carried out in a continuous manner, and the following prior art patents are representative of known continuous extraction techniques utilizing the hexane or similar hydrocarbons as the extraction solvent.

According to U.S. Pat. No. 2,206,595, oil-containing raw material is extracted in a vertical column, to which it is delivered from storage via a feed screw, the column being divided into multiple stages separated by rotating perforated discs, each associated with a fixed scraper blade, the extraction solvent, e.g., hexane, being delivered to the bottom of the column with the mixture of dissolved oil and solvent, called miscella, being removed near its top. In communication with the bottom of the column via a feed screw and feed box is a vertically extending conveyor of the flight type moving in a continuous generally L-shaped path, which carries an ascending column of the extracted solid residue in admixture with solvent. The conveyor extends above the working height of the extraction column and, being filled with solvent, functions as a barometric leg offsetting the hydrostatic pressure of the extraction medium in the column. Miscella is drawn off below the top of the conveyor leg with the solid residue discharged at a higher point on the leg.

In a later filed U.S. Pat. No. 2,203,666 the same inventor disclosed an alternative way of supporting the hydrostatic head of the vertical extraction column in the form of a helical screw conveyor or packer screw receiving the solvent-solid residue mixture delivered by a superposed feed screw of smaller diameter out of the column bottom and advancing the same through an annular passage having its central core flaring somewhat outwardly to narrow the annular radius thereof. A spring biased conical disc pressed against the discharge end of the annular passage, applying mechanical pressure to the solid matter there so as to create a compressed "plug" of the solid residue of sufficient density as to support the hydrostatic head of the extraction medium.

Earlier in U.S. Pat. No. 2,184,248 Bonotto had combined the feed screw and packing screw coaxially, the larger packing screw receiving incremental amounts of solid residue packing the same against a spring loaded yieldable conically shaped closure disc into a solid plug impervious to the flow of solvent therethrough.

More recently, in Schumacher U.S. Pat. No. 4,390,506 an extraction vessel is fed a slurry of recovered miscella and raw material under conditions minimizing exposure of the raw material to atmospheric oxygen rapidly causing rancidity. Thus, the flaked raw material discharges directly into a vertical hopper maintained under a vacuum aspirating entrained air. Near the hopper bottom recycled miscella is admitted to form a slurry, and the miscella-raw material slurry gravitates into the lower end of an upwardly inclined screw conveyor which dumps at its upper end into the extraction chamber. The hopper-inclined conveyor arrangement is kept filled with miscella, thereby continuously immersing the raw material in miscella and precluding contact with air. Fresh solvent is fed at the top of the extraction chamber, and the miscella is taken from the bottom thereof, a part being recycled to the raw material hopper and the remainder recovered for use. Solid residue is also taken from the bottom of the extraction vessel by a screw conveyor.

A mechanically simplified and refined system was proposed by Schumacher in U.S. Pat. No. 4,617,177 using the screw conveyor itself as the extraction chamber, the screw conveyor being horizontally disposed with the pitch of its flights increased or widened toward its discharge end. The raw material and extraction medium, i.e., solvent and/or miscella, are both introduced into the end of the conveyor where the flights are closest and additional medium is also supplied at axially spaced points along preferably about the first half of the conveyor length. Extracted solid residue is discharged from the opposite end of the conveyor, and just upstream of that end the conveyor is perforated for passage of the miscella. Several such units can be combined in series, the miscella from each such stage is perferably collected separately and recycled to the immediately preceding stage. Effecting extraction contact directly in a screw conveyor of expanding pitch achieves efficient mixing, avoiding the considerable excess of such medium normally required for complete wetting in extraction columns.

Although the extraction conditions and equipment for oil-containing vegetable material using a normally liquid solvent, e.g., hexane, are technologically simple, these advantages are considerably offset by the problems encountered in separating the solvent from the extracted oil and defatted meal. Separation of the normally liquid solvent from the oil involves a distillation operation, requiring the application of large amounts of heat to the miscella, and, moreover, the essential elimination of the solvent from the recovered oil by distillation is difficult, if not impossible, because the recovered oil has a preferential attraction to a certain minimum amount of solvent. Similarly, complete removal of solvent such as hexane from the solid residue is virtually impossible by practical desolventizing techniques such as steam-stripping or the like. By way of illustration, analysis of hexane loss in a modern rapeseed extraction facility with a capacity of 800 MT/day revealed the presence in the meal of 0.18% by weight of hexane, despite the treatment of the meal in a desolventizer-toaster.

The presence of such levels of residual hexane in the recovered oil and/or solids residue is undesirable and is in fact prohibited by government regulation in some localities. Disregarding the possible deleterious consequences of human consumption of such products, even this apparently small quantity of solvent represents an appreciable loss if solvent in economic terms based on large volume production. Thus, the facility described above experienced a hexane loss in the meal alone of well in excess of 1 MT/day.

For more than fifty years, the art has recognized that such oil-containing vegetable material can also be extracted with normally gaseous hydrocarbon solvents, such as propane, by imposing during extraction a sufficient pressure in the extraction chamber to maintain the solvent in liquified condition. Operation pressures proposed in such process vary widely, but as a minimum must exceed about 125 psi for propane at room temperature operation and even higher pressures if the temperature is elevated. However, the introduction of the raw vegetable matter into the extraction chamber, as well as the removal of the solid residue therefrom is complicated at such levels of pressure, and initial proposals utilizing this approach involved batch operation, usually with two or more extraction vessels being arranged in parallel for alternative onstream operation so that one could be filled or emptied, while the active extraction is being carried out in the other.

Early examples of batch-type extraction processes utilizing a pressurized liquified gas, such as propane or butane, are disclosed in U.S. Pat. Nos. 1,802,533 and 1,849,886. In the former, an extraction vessel is filled with raw material to which the liquified solvent is supplied, and after extraction the miscella or solvent extracted oil is distilled by heating, driving off the solvent vapors which are condensed and recycled for subsequent extraction, the oil remaining after the distillation for removal and use. In the latter, a plurality of extraction units, e.g., five, are arranged in parallel and the separation and recovery of the solvent are achieved in more efficient fashion through the assistance of vacuum. Vacuum may be applied to the extraction chamber after loading with raw material to exhaust the air therefrom before admission of the liquified solvent as well as to the extracted oil remaining after heat distillation to maximize elimination of solvent. The distilled solvent vapors are fractionated in a fractionation column and after condensation recycled to solvent storage for reuse.

Although the use of normally gaseous extraction solvent in pressure liquified condition requires elevated pressures, this disadvantage is to some extent offset by the more ready removal of the solvent from both the solids residue and the extracted oil due to its inherent vaporization when the liquifaction pressure is removed. Nonetheless, efficient recovery of such solvents calls for rather complicated recovery systems such as that seen in U.S. Pat. No. 2,560,935. Using two extraction vessels, operating batchwise in alteration, the extraction mixture, consisting of solid residue, extracted oil and solvent, is here delivered to a settling tank wherein the heavy solid residue settles out for passage to a separator vessel from which the entrained solvent is allowed to escape under reduced pressure. The miscella is taken from the top of the settling tank and is transferred to a phase separation tower with heating either by a preheater and/or tower heaters to a temperature near the critical temperature of the solvent and above the maximum solubility temperature of the oil dissolved therein. Consequently a more dense liquid oil phase separates and entrains solid fines therein for discharge from the tower bottom. The remaining oil-solvent mixture is passed to a separator wherein the pressure is released, causing the solvent to vaporize, leaving the liquid oil for removal. After recompression, the solvent vapors are recycled to solvent storage.

Removal of solvent by vaporization consumes large amount of heat because of the absorption of the heat of vaporization which is not recoverable for further vaporization although it can, of course, be used for raising the sensible heat of fresh or recycled solvent. Also, the specific heat of, e.g., propane, increases drastically as its critical temperature is approached. The first of these problems is solved (while the second is actually aggravated by U.S. Pat. No. 4,331,695 wherein batchwise extraction and thermal phase separation of the miscella are carried out isobarically at near-critical pressure, the temperature of the extraction being near critical and that of the phase separation being super-critical without taking up the heat of vaporization. At super-critical temperature, a dense phase of oil separates and can be removed while a less dense phase of solvent can be recirculated by a pump to the extraction, giving up heat to miscella proceeding to phase separation and becoming more dense for greater solvent action.

Another suggested approach has been to admix the raw material with a sufficient amount of oil to form a pumpable slurry which lends itself to a continuous extraction operation since a slurry can be continuously introduced into the pressurized extraction unit under a greater pump pressure using available high pressure pumps. One such disclosure appears in U.S. Pat. No. 2,548,434 wherein the extraction unit for vegetable oils, such as soybean and cottonseed oils, using propane or the like, in countercurrent flow is maintained at near critical temperature, usually 150°–250° C., and under a sufficiently high pressure to maintain the solvent liquid, e.g., from about 400–600 pounds. At these conditions and with a ratio of solvent to extracted oil of 15–30:1, the extraction proceeds selectively or preferentially for the light colored fatty matter, while undesirable components including color bodies, phosphotides, gums, etc., are rejected and remain with the residue, e.g., as a heavy miscella phase. The solid residue and the latter phase can be withdrawn from the unit and the solvent flashed off under a vacuum flasher. The lighter miscella leaves from the top of the unit and may also be subjected to flashing to remove the solvent and leave the liquid oil for recovery, the flasher temperature being reduced to around 120° F. The liquid oil from the flasher can be chilled in one or more stages under still lower pressure and a sufficiently low temperature to crystalize a high melting oil fraction which is removed by filtration and stripped of residual solvent. The remaining lower-melting fraction is stripped in a three-stage unit in which the initial stage operates at a pressure exceeding the extraction pressure and the final stage under a vacuum.

Handling of the raw solids in pumpable slurry form with liquified solvent is also taught in U.S. Pat. No. 2,564,409, using countercurrent extraction flow at a temperature from ambient to 160° F., a pressure of 50–700 psi, and a solvent/oil ratio by volume of 3–10:1. The residual solids are removed as a slurry, and the solvent is flashed under reduced pressure with heating. The miscella is subjected to fractionation in countercurrent contact with fresh upflowing solvent at approximately its critical temperature, e.g., about 150°–210° F., at which the extracted oil loses solubility in the solvent, the temperature being adjusted to select the desired fraction. A part of the miscella can be separated before fractionation and, after solvent stripping, recycled for slurrying with fresh raw material.

While slurries of the raw material in the liquified solvent are suitable for continuous processing, they require large excess quantities of solvent over that needed merely for efficient extraction of the oil content of the raw material. Such excess quantities in turn have to be separated from the oil and treated solids which greatly increase the amounts of heat (or cooling) required and of power necessary to recompress (or evacuate) the solvent to effect the changes in the state of the solvent. Thus, the overall consumption of energy inherent in slurry operation is at least non-competitive, if not prohibitive. Nonetheless, continuous operation is virtually indispensable for the economical processing of large volumes of raw material for marketing at the low cost price that can be demanded for these bulk commodities, and isolated attempts are found in the art to carry out some kind of continuous processing with liquified solvents that does not depend upon the use of solvent slurries.

An early example, as an optional alternative to straight batch operation, is found in U.S. Pat. No. 2,247,851 which is directed to the extraction of the residual oil content of so-called cracklings, i.e., the brittle solid sediment resulting from the steam rendering of lard from animal fats to yield a protein-containing solid suitable for chicken feed. Here, the cracklings were extracted in a horizontal chamber housing several axially arranged rotating drums in contact with liquified solvent flowing at a certain depth therethrough, being loaded and emptied at opposite ends of the chamber by horizontal screw conveyors, the downstream one of which was steam-heated. Each such conveyor was, in turn, equipped with a double-lock compartment to admit or discharge the material in successive batches in an approximation of continuous operation. The extracted solids were removed from the chamber, digested in admixture with hot water and finally dried.

The same concept was adapted in U.S. Pat. No. 2,254,245 to cottonseed meats to produce cottonseed oil of improved quality using multiple serially-joined extraction stages, the series being preceded and followed by the loading and unloading screw conveyors and associated feeding compartments, the miscella of each stage being separately manipulated during purification. The first extraction stage was held at $-5$ to $-15°$ F. to exclude high melting components from the extracted oil and minimize the amount of dissolved coloring matter, with subsequent stages at progressively higher temperatures up to, e.g., about 80° F. Conditions for separating the miscella components were also controlled, the first-stage miscella after filtration being distilled initially at no more than 210° F. under super-atmospheric pressure with the remaining liquid phase re-distilled at progressively decreasing pressures. Distillation of the miscella from the other stages took place similarly.

Quite recently, continuous extraction was described in EP application 0129739, published Jan. 2, 1985, where a vertical extraction vessel was fed by means of a screw-press compressing the oil-containing raw material under sufficient mechanical pressure to express directly a substantial amount of oil, e.g., 50% by weight, which was removed through a perforated wall. This press then, by means of a throttling constriction in its annular area downstream of such oil expression and just upstream of its connection into the extraction vessel created a constantly regenerated solid plug or dam of raw material resisting the extraction pressure. Extraction was under super-critical conditions with $CO_2$, propane or the like, under a pressure ranging from 250–750 bar (about 3600–10880 psi), at a temperature of 40°–110° C., and for a treatment time of 0.5–2.5 hours. Pressure at the outlet end of the vessel was maintained by a similar non-expressing screw press creating a similar solid plug in the same manner. The extracted miscella was separated into multiple fractions by multi-stage fractionation at different combinations of heat and reduced pressure.

The power required to drive a high compression screw-press as in the latter system, especially if and for cereal brans, is extremely large and, moreover, mechanically expressed oil tends to be of low quality with an unacceptable level of impurities and must be further purified. Hence, the need for an energy-efficient and economical continuous procedure for extracting oils from natural vegetable matter, particularly cereal brans, with a low boiling liquified solvent remains unsatisfied in the art.

The extraction of oil from brown rice, and rice bran specifically (as here preferred), with normally liquid solvents is itself well known in this art. In U.S. Pat. No. 2,538,007, brown rice is said to be stabilized against its normal susceptability toward rancidity due to lipolysis by extracting the same with hexane or like normally liquid solvent at a temperature from ambient to the solvent boiling point to remove "free oil", the principal cause of rancidity in rice.

The oil content of rice is concentrated in the germ and bran, i.e., the brown layer beneath the hull, and extraction of oil from the bran was found, according to U.S. Pat. No. 2,727,914, to be promoted by subjecting the bran to mild pre-cooking at 170°–235° F., with its moisture content controlled at 14–26%, for 15–70 minutes preferably in several stages of increasing temperature and decreasing moisture content. Reduced solvent/raw material ratios of 0.7–1/1 (about one-half the normal requirements absent pre-cooking) were effective.

In U.S. Pat. No. 2,829,055, rice oil is obtained by extracting whole dehulled rice grains still carrying their brown covering or bran, with hexane, etc., at a temperature below its boiling point, e.g., 40°–60° C. Such treatment renders the bran more readily removable from the rice grains by subsequent milling. Rice oil is separated from the solvent by fractional distillation.

The actual milling of brown rice, according to U.S. Pat. No. 3,261,690, is carried out in the presence of solvent, preferably hexane, for simultaneous extraction of the fatty components, the bran being softened and flushed away by the solvent which also minimizes overheating and prevents damage to the rice grains. The oil and solvent, after removal of the bran solids, are separated by an evaporator separator and stripping column. Preferably, recovered rice oil or a strong miscella thereof is recycled for admixture with the brown rice as a bran-softening agent.

OBJECTS OF THE INVENTION

The basic object of this invention is to provide a continuous process for extracting the oil content of oil-containing vegetable matter using as the extraction solvent a liquified normally gaseous hydrocarbon in which the vegetable matter is continuously delivered to a pressurized extraction zone in a manner that avoids the excessive energy consumption and consequential high cost inherent either in feeding the matter as a slurry admixture with oil or in mechanically compressing the matter in a delivery conduit upstream of the zone into a solid dam of sufficient density to itself contain the pressure in the extraction zone.

Another object of this invention is a method for the continuous feeding of oil-containing vegetable matter to a pressurized oil extraction zone in which the matter while advancing on the way to that zone is compacted in the presence of a minor amount of an innocuous normally liquid sealing medium into a coherent plastic mass undergoing constant regeneration and which is capable of sustaining the pressure of the zone.

A further object is a continuous oil extraction process utilizing pressure-liquified propane or butane as the extraction medium under mild substantially subcritical extraction conditions in a closed extraction zone while supplying raw material to such zone by means of a helical screw-type conveyor modified to create therein upstream of the zone a compaction zone in the raw material while an effective amount of about 10% by weight of material of an innocuous normally liquid sealing medium is introduced into the compaction zone to form with the compacted feed material therein a dough-like plastic mass capable of preventing leakage of the extraction zone pressure through the screw conveyor, the density of the matter in the compacted zone in the absence of the medium being substantially less than that capable of preventing such leakage.

Yet another object of the invention is a highly energy efficient recovery system for separating the admixed extracted oil and liquified extraction solvent resulting from the extraction process for ultimate consumption and/or reuse, respectively, and for recovering the solid residue with minimum remaining solvent.

These and other objects will be perceived from the following description of the invention when read in conjunction with the accompanying drawing which is a schematic representation of one embodiment of a continuous oil extraction unit embodying the concept of the invention with an associated solvent-oil-solids separation and recovery system.

GENERAL DESCRIPTION OF THE INVENTION

According to the present invention, oil-containing vegetable matter is subjected to continuous extraction to extract essentially the oil content thereof, utilizing as the extraction medium a liquified normally gaseous hydrocarbon solvent having a boiling point substantially below room temperature. Propane is the preferred extraction medium having a boiling point at normal pressure of $-39°$ C., but butane with a boiling point of $+1°$ C. is also useful for this purpose. The extraction with the liquified solvent is carried out in a sealed extraction zone which is maintained under a pressure sufficient to liquify the same at the operating temperature, both pressure and temperature being selected to be substantially below their critical levels for the selected solvent. The critical pressure for propane, for instance, is above 600 psi (43 bar), while its critical temperature is 97° C. A suitable practical range of operating pressure is about 125–250 psi with about 150–200 psi being preferred, and while the preferred operating temperature is room temperature, higher temperatures can be selected if desired up to perhaps 40–50° C. A pressure of 125 psi is needed to liquify propane at room temperature, and while lower temperatures could perhaps be employed, permitting lower pressures, this would necessitate chilling which would consume power with no compensating benefit under ordinary circumstances. In general, there is no significant advantage in carrying out the extraction under either higher pressures than that achieving the requisite liquified state of the solvent or higher temperatures. Consequently, it is preferred that the extraction conditions be comparatively mild in order to avoid the mechanical constraints on the system that would otherwise be imposed in order to effectively contain higher pressures.

In accordance with the invention, the raw or starting vegetable matter to be extracted is continuously introduced into the pressurized extraction zone, usually adjacent one end thereof, by means of an elongated helical screw conveyor, receiving the matter at its inlet end, for example, from a hopper or other supply reservoir, or a belt or flight conveyor from a milling unit therefor, and discharging it at the opposite end into the interior of the extraction zone. The screw conveyor, in addition to advancing the matter to the zone, is designed to subject the advancing matter to compacting pressure to densify the same compared to its normal bulk volume. While the matter is within the compaction zone, it is admixed with a sealing medium which is normally liquid, e.g., at ambient temperature and pressure and is injected through the conveyor wall, via a port as the like, under sufficient pressure, say, by a pump, to penetrate into the compacted matter. The amount of the sealing medium is controlled within a limited range, far below that capable of forming the matter into a slurry, of about 2–3 to about 10% by weight of the matter being conveyed, the selected amount being in any case effective to convert the compacted matter in the compaction zone into a stiff dough-like plastic mass.

The raw matter being processed needs to be in generally comminuted condition, i.e., in the form of flakes, granules or particles, and in such condition is substantially free flowing in character. Thus, for example, if a container filled with the starting vegetable matter were to be inverted, the vegetable matter will fall free therefrom. Likewise, if piled, it would exhibit an angle of repose. The degree of compacting pressure applied by the screw conveyor in the compaction zone cannot be defined with exactitude because it will likely differ with different raw materials but is, in any case, insufficient to alter this generally free flowing condition of the raw matter being processed in the absence of admixed sealing medium. That is, while the compaction makes the matter being conveyed significantly more dense, with the free or interstitial space thereof substantially reduced, its essential comminuted state remains unchanged in the absence of the injected sealing medium. Furthermore, the compacted matter in itself definitely lacks sufficient mechanical coherence or integrity to withstand or support the operative levels of pressure existing in the extraction zone, i.e., prevent leakage of the solvent therefrom, even under the mild combination of conditions contemplated here, e.g., as low as 150–200 psi. In fact, at such levels of extraction pressure the solvent will readily leak past the compaction zone and out of the conveyor, vaporizing into the atmosphere, accompanied where the raw material includes fines by a cloud of fines and may in some instances actually blow the compacted matter out of the conveyor conduit, all in the absence of the admixed sealing medium.

In contrast, the introduction of the normally liquid sealing medium into the compacted matter within the compaction zone effects a change in its condition to a stiff dough-like plastic state which behaves as a continuum and possesses sufficient coherence or mechanical integrity to withstand the intended operative levels of extraction pressure without leakage. As stated, the amount of the added sealing medium is far below that forming a slurry or pumpable suspension with the vegetable matter being treated, and indeed, as the amount of introduced sealing medium is increased beyond the maximum indicated approximately above, the sealing effectiveness of the resultant mixture decrease progressively and is lost fairly quickly.

In its starting condition, the matter to be processed, of course, consists of the solid flakes or granules with free spaces or interstices therebetween; and although the compaction pressure reduces such free spaces or interstices significantly, they persist to some degree in the compacted mass. It is believed that the liquid sealing medium needs to be present in essentially that amount that is effective for filling the residual interstices and thereby blocking the same against penetration by the pressurized extraction solvent or its vapors. Furthermore, the sealing medium in admixture with the compacted matter exerts a certain frictional adherence for the surfaces of the screw conveyor and thus increases its ability to resist the pressure of the extraction zone.

The quantity of sealing medium cannot be great enough to by itself change the state of the comminuted solid matter when admixed therewith until brought under compaction pressure. That is, the sealing medium when thoroughly mixed, e.g., by stirring, with the uncompacted comminuted matter even at the upper limits of the range specified above does not significantly alter the state of the resultant mixture, such mixture remaining substantially free flowing. Presumably, the sealing medium in its amount within the indicated range is only enough to be adsorbed by the pores and surface of the uncompacted comminuted solid matter without rendering the same coherent or in mechanically adhering relation. It is only when the sealing medium-comminuted matter mixture is compressed in the compaction zone that it exhibits the essential change in state required by the present concept, i.e., to a dough-like plastic mass or continuum instead of free flowing flakes or granules. As a plastic, the compacted mixture exhibits the relationship of shearing rate response to applied shearing stress characteristic of plastics. Thus, the mass shows no response to an applied shearing stress, in terms of shearing rate, until the applied stress reaches a certain minimum level, after which continued application of increasing shearing stress results in shearing at a rate which then increases. Once a critical shear stress at which a shear rate takes place is achieved, it is irrelevant for present purposes precisely how the shearing rate behaves as a function of increasing shear stress, i.e., whether a plot of the rate of change is linear or curved and, in fact, the exact behavior of the inventive mixtures after the shear rate level has been reached has not been thus far evaluated. It seems likely that some general correlation should exist between those shearing stresses which produce zero shear rate for the inventive mixtures and the operative extraction pressure conditions in order for such conditions to be effectively contained by the compacted sealing medium-comminuted matter admixture.

An important limitation on the invention is the utilization of a level of compacting pressure and corresponding densification of the comminuted solid matter which is insufficient to cause any mechanical expression or exudation of the oil or other liquid content from the raw solid matter being handled, and indeed according to the invention the compacting pressure is quite considerably less than that required for physical expression of liquid from the solid matter. This limitation distinguishes the inventive operation from that of EPO 129,729 described in the prior art summary above and makes possible an important reduction in the levels of mechanical force that must be applied to the screw conveyor and consequentially in the power consumed during actual operation. Such reduction in power consumption is a basic objective of the present invention. The particular level of pressure at which a given raw material manifests expression of its liquid content will naturally vary with the particular material. Cereal brans, even rice bran with its 20% content of oil, are especially resistant to oil expression under mechanical pressure. Attempts to determine the threshold pressure of rice bran were unsuccessful inasmuch as the test press being used failed at pressures between 5,000 and 6,000 psi well before visible expression of the oil had occurred. Based on this incomplete evaluation, the threshold pressure for oil expression from rice bran is presumably in the order of around 10,000 psi or higher. The threshold pressure for other materials may be different depending upon their composition. Other cereal brans would be expected to be at least as high as, if not higher than, rice bran, while vegetable seeds, usually containing higher amounts of oil, would likely have somewhat lower expression pressure thresholds. Nonetheless, it is indispensable in the practice of this invention to avoid direct expression of the oil (or other liquid content) from the comminuted matter being processed during compaction in the screw conveyor irrespective of the manner in which such compaction is achieved.

Apart from these general limits and other considerations, effective levels of compaction pressures and solids densification cannot be specified and will have to be determined by experimental under actual conditions.

Various modifications can be made in the screw conveyor design to establish the compaction zone therein. Preferably, such compaction is achieved by providing a standard section or length of a helical screw conveyor capable of advancing the comminuted vegetable matter axially forwardly with its flights having a forward pitch suitable to this end, followed by a short open region that is free of the screw ribbon or blade, which constitutes the compaction zone, and is in turn followed by a reverse feeding screw conveyor section having the pitch of its blades directed oppositely to that of the forward feeding conveyor section. The intervening open conveyor section need not be completely open since the conveyor shaft may, and normally will, pass therethrough so as to simplify the driving arrangement of the conveyor sections; only the conveyor blade is omitted in this section, and if desired, small isolated segments of the blade may even be retained in this section for agitating purposes. The combined effect of the successive separated forward feeding and reverse feeding sections of the screw conveyor is to subject the comminuted material to opposing mechanical forces in the intervening open zone, achieving the desired degree of compaction. The compacted matter must eventually pass through and beyond the reverse feeding conveyor section for delivery to the extraction zone, and this is permitted by means of a reduction in the diameter of the blade of the reverse feeding section defining a small clearance space between the periphery thereof and the internal wall of the screw conveyor. Although the reverse feeding section is effective to impart a backward thrust to the comminuted matter in contact therewith, as additional amounts of raw material are supplied to the inlet of the conveyor and acted upon by the forward feeding section thereof, this backward thrust is eventually overcome by the annulus of compacted material adjacent the conveyor wall which follows the path of least resistance is eventually forced through the peripheral clearance space around the reversely inclined conveyor blade and onto the next region of the conveyor.

As an alternative to the reverse feeding section of the conveyor, compaction of the comminuted raw material can be achieved by modifying a continuous forward feeding conveyor section upstream of its communication with the extraction zone to produce a direct throttling or constrictive effect on the comminuted matter being conveyed. This can be achieved either by increasing the diameter of the central core of the screw conveyor or gradually decreasing the external diameter of the conveyor. In either case, the comminuted matter being conveyed encounters substantially increased resistance to passage through the narrowed conveyor passage and thus receives compacting pressure.

The liquid sealing medium must be normally liquid at conditions ambient to the screw conveyor and can be selected from a considerable variety of known liquids. It must, of course, be innocuous at least if the extracted oil is intended for consumption by humans or animals and not for industrial uses; e.g., as a lubricant; and it must not deleteriously affect the desirable properties of the extracted oil for its intended purpose. A preferred sealing medium can be a recycled portion of the extracted oil itself which then becomes added to the eventually extracted oil and obviously cannot be detrimental. However, virtually any other liquid satisfying the basic criteria just specified could be successfully substituted with certain apparent caveats. Water is in principle useful for this purpose and is in fact a preferred medium for use at the discharge or outlet side of the extraction zone when the compaction sealing principle of the invention is applied to that side, but the selection of water as the sealing medium for the delivery or inlet side of the extraction zone is normally contraindicated, at least for rice bran and other cereal brans. Such brans tend to be somewhat hydrophilic in surface character and hence have a preferential affinity for hydrophilic media such as water. The liquified hydrocarbon solvent medium, on the other hand, is strongly hydrophobic, and the association of added free water with the comminuted solid matter tends to reduce the efficiency of the extraction action in impeding the mass transfer of the solvent media into the internal pores of the comminuted solid matter for dissolution of the oil content therefrom. If water is to be the sealing medium at the inlet side, the extraction's conditions, especially residence time, may need to be made more stringent.

It will be apparent that unless the sealing medium is a recycled fraction of the extracted oil itself, the selected medium should be adapted for ready separation from the extracted oil except, of course, where the extracted oil is destined for usages where admixtures with the sealing medium can be tolerated. If the aim of the extraction is to recover a particular oil of principle value for its own unique properties, then certainly the sealing medium must be capable of essentially complete removal from the oil by some economically acceptable separation technique. Hence, other liquid glycerides, such as cottonseed oil or soybean oil, which would otherwise be acceptable sealing media, would not be desirable for the extraction of, say a unique edible oil such as rice oil or olive oil, because of difficulties in achieving effective separation of these generally comparable substances. That is, most glyceritic oils contain in varying amounts glycerides of the same kinds of fatty acids which cannot be differentiated so that the desired oil loses its distinctive character when admixed therewith. Naturally, if the fatty components are sufficiently different, then this problem disappears. Other media such as ethanol, various ethylene glycols, and $C_{10-20}$ hydrocarbons can be employed provided their residual levels are within acceptable limits with regard to the intended purpose of the recovered oil.

At the low level of sealing medium involved in the invention, no free oil exists. Hence, no percolation of that medium outside the compaction zone will occur The present process is not unique in the choice of the quantity of solvent employed for the extraction, and in general volume ratios of solvent to comminuted starting matter consistent with those employed in non-slurry type extraction procedures of the prior art can be employed here. A volume ratio of solvent to starting matter in the range of about 1:1–3:1 will be satisfactory. The minimum ratio could conceivably fall as low as 0.8:1, but the extraction efficiency may be reduced at this low level and a somewhat larger minimum is suggested. Higher volume ratios above the stated maximum could certainly be adopted; but no significant benefit is perceived for the same, and excess solvent increases the load imposed upon the solvent separation and recovery system. It is, of course, desirable that the volume of solvent be sufficient to completely fill the extraction zone, containing the vegetable matter to be extracted; and this will ordinarily occur in any event when the extraction proceeds countercurrently as is preferred. The extraction solvent must be supplied under a sufficient pressure differential above the selected extraction pressure as to drive the same through the extraction zone. Typically, a pressure differential equalling a few feet of water will suffice; and higher pressures achieve no corresponding improvement and call for more powerful and expensive pumping equipment.

As regards the flow directions of the solvent and comminuted matter within the extraction zone, as the art understands, countercurrent flow directions achieve more efficient extraction inasmuch as fresh solvent with maximum extraction power is brought into contact with material that has already given up most of its oil content and has minimum remaining oil to be removed. Such remaining oil is, however, the most difficult to eliminate in terms of extraction kinetics, and the fresh oil-free solvent has the highest potential to reach and remove the same. Nevertheless, concurrent extraction is sometimes used in the art and can be utilized; although some loss in efficiency should be expected and the recovered solid residue may contain a higher level of unremoved oil.

As stated previously, the preferred raw material for this invention is rice bran from which rice bran oil is to be recovered. Rice bran oil is recognized as a superior frying oil, being high in antioxidant constituents so as to resist oxidation when heated during cooking and thus possessing an increased useful life under frying conditions of perhaps double that of other conventional frying oils. Rice oil is also considered among the more valuable oils from a dietary standpoint and is preferred, for example, as a salad oil. The rice oil as obtained by the practice of the present invention has a very desirable combination of properties compared to the product resulting from conventional extraction with a normally liquid solvent such as hexane. Thus, it is virtually transparent and lightly tinted as contrasted with the ordinary cloudy almost emulsified more darkly colored appearance of hexane-extracted oil and has a much reduced level of gums or phospholipids, such as lecthin, amounting to perhaps as little as 5% of that found in hexane-extracted oil. Its water content is typically low; i.e., about 0.7%, but can be made even lower by drying. It has a clean sweet aroma; whereas hexane-extracted rice oil tends toward a petroleum odor reminiscent of machine oil.

Rice bran results from the milling under abrasive conditions of dehulled or dehusked brown rice grains, which abrades the brown covering therefrom, leaving polished white rice grains with the bran as a by-product in the form of small flaky particles. As the art is aware, unless the bran by-product is stabilized, it, due to its oil content, is highly susceptible to lipolytic rancidity if left to stand for even a few hours, and such lipolysis imparts off-flavors usually rancid in character. Hence, the starting rice bran needs to be processed in accordance with the invention as soon as reasonably possible after milling and while still fresh. Alternatively, the art has developed techniques for effecting so-called stabilization of the rice bran so as to inhibit the undesirable lipolysis thereof by exposing the same to controlled heating to inhibit the enzymes present therein that appear to promote or catalyze the stray lipolysis. The processing of stabilized rice bran by this invention is less advantageous, however, because the stabilization treatment is accompanied by certain undesirable consequences; namely, a tendency to agglomerate the bran particles into larger granules and to decrease the solubility of the protein fraction of the bran, rendering it less useful as a bakery product. Therefore, it is preferred to process freshly milled rice bran even though the treatment of stabilized rice bran is within the scope of the invention if circumstances dictate.

Brans from cereals other than rice are available in the marketplace, such as wheat bran, oat bran, barley bran and so on. These and other similar brans behave in the present treatment in essentially the same fashion as rice bran if processing conditions are adjusted to suit their special needs arising from different oil content or different particle size. Most vegetable seeds contain a significant quantity of oil such as corn oil, rapeseed oil, flaxseed oil, soybean oil, cottonseed oil, olive oil, cocoa oil, and so on; and in this instance, it is the whole seed that needs to be extracted, usually after grinding or other pulverization so as to render the oil content more accessible, all as is known in the art. Such vegetable seeds are more commonly processed to give up their oil content through mechanical pressing techniques according to often long-standing practice; and if desired, the invention can be employed as an adjunct to such conventional extraction procedures. The pulp or solid residue therefrom still contains an appreciable amount of oil, and hence this by-product is imminently suited for the treatment of the invention, being already in a crushed or pulverized state.

Many prior art extraction techniques, especially those operating in batch fashion, are said to be readily applicable to the extraction of animal oils from animal fats and/or meat by-products. Although no attempt has yet been made to ascertain the feasibility of the present process with such animal-derived raw materials, it appears doubtful this will prove successful. Animal products are high in water, in addition to any oil content which would not only tend to interfere with the extraction mechanism itself but, more significantly, with the compaction plastification underlying the present invention. In other words, it is anticipated that the manipulation of animal-based raw materials in the screw conveyor as contemplated here would prove impractical due to the large quantities of water that would be unavoidably generated. On the other hand, if the animal products have been previously processed in other ways to yield a more or less granular material with relatively low moisture content of no more than a few percent, such products would essentially resemble vegetable material in physical properties, and then any residual oil content in such materials might considerably be effectively extracted by this process.

The present extraction yields a miscella as a liquid phase mixture of the solvent and extracted oil, of which the oil typically constitutes about 16-30% by weight, at least in the case of rice oil, with the balance solvent, the miscella being taken from one end of the extraction zone while the solids residue of the raw material amply wet with solvent is taken from the other end. Being liquid, the miscella can be continuously removed without difficulty, but the removal of the extracted residue from the discharge or outlet end of the extraction zone encounters basically the same problem as does the delivery of the comminuted raw solids to its delivery and inlet end. Preferably, the compaction plastification principle of the invention is utilized at both of the discharge and delivery ends of the extraction zone. Thus, the discharge end of the extraction zone, preferably its lower end to take advantage of gravitational forces, is designed to empty into the inlet of a second screw conveyor, similar to that at the delivery side but reversed in orientation. This conveyor consists, as before, of a forward advancing section, an open section defining a compaction zone, and a reverse feeding section for imparting sufficient rearward thrust to achieve the desired compaction. The selection of the sealing medium for the discharge screw conveyor is less critical because the oil has already been removed eliminating any undesirable oil dilution. Hence, water is well suited as the discharge sealing medium. As before, alternative mechanical arrangements for achieving mechanical compaction within the compaction zone are available and useful. The limits on the amount of liquid sealing medium are the same at both ends of the extraction zone; namely, 2-3-10% by weight of feed, the mechanical forces being withstood and the working conditions being virtually identical at either side.

It is within the scope of the invention to employ other devices for sealing the discharge end of the extraction zone which does not utilize the compaction plastification principle, but it is strongly preferred to apply this principle to both ends of the extraction zone in order to achieve a symmetry and simplicity of design combined with very efficient and energy saving operation.

The various components of the present extraction system can be arranged in a number of ways in a spatial sense. A preferred arrangement is a single elongated continuous screw conveyor conduit containing at its opposite end regions the screw feeding and discharging section, each interrupted by its compaction zone and separated by an open length serving as the extraction zone. Ideally, such a single continuous tube is disposed vertically, but horizontal alignment as well as various angles of inclination between these extremes could be used if preferred. A single continuous system affords practical design efficiencies since a single continuous drive shaft extending the entire length thereof can be employed with the necessary screw conveyor segments or flights being carried thereby at the appropriate regions along its length, the common drive shaft being driven from a single drive motor. However, it will be evident that separate screw conveyors could be provided at the opposite ends of such a continuous tube, each driven by its own motor, with the intermediate region of the tube entirely open to constitute the extraction zone.

If increased residence time for the comminuted matter in the extraction zone is indicated, as an alternative to simple lengthening of the region intervening between the feed conveyors, the diameter of that region could be increased which will, of course, reduce the overall length of the arrangement. The feed and extraction zones need not be coaxial and a common arrangement in the art used in connection with normally liquid solvent extraction wherein feed conveyors are disposed horizontally in the opposite ends of a vertically oriented extraction vessel is certainly acceptable. Or, the axial disposition of the sam sections could be reversed; i.e., the feed conveyors extending vertically and the extraction vessel horizontally. Gravity will assist in the feeding of the solids if the extraction zone is vertical, and agitators may be provided to promote thorough mixing of the comminuted solids with the liquified solvent. Similarly, the addition of a supplemental forwardly feeding screw blade downstream of the compaction zone just prior to the extraction zone is helpful in opening up the compacted solid matter for more efficient contact with the extraction solvent. The same measure might well be applied to the discharge conveyor section emptying the extraction zone to facilitate manipulation of the solids residue for recovery of the residual solvent therefrom.

Obviously, the feeding rate of the screw conveyor(s) will be governed by various operating parameters and can be easily selected according to the design capacity and configuration of a specific system based on available conveyor specifications. It is not necessary that the raw material be supplied in sufficient volume to completely fill the screw conveyor; a partially starved screw conveyor feeds as well as a full one. The compaction zone will in any case remain completely full whether defined by an open region between the oppositely feeding conveyor flights or by a throttling conveyor passage. Therefore, the desired sealing effect will be achieved with feed rates below full capacity, permitting extraction to be practiced satisfactorily with reduced loads of starting material. On the other hand, the sealing effect of the invention if the feeding is stopped completely persists for only a few minutes and is lost if stoppage continues beyond this time. Therefore, if circumstances require such stoppage, precautions should be taken to avoid loss of the extraction solvent. To this end, the extraction zone should be emptied of solvent and evacuated of solvent vapor to avoid any risk of explosion, mixtures of air and propane being known to be explosive. For the same reason, general precautions should be taken in designing any specific system to minimize possible risk of explosion; e.g., by employing explosion-proof electrical components, motors and the like, minimizing the opportunity for sparks to be created, etc.

Design configurations for conveyor screws are well developed, and the selection of the type and capacity of screw conveyor for this invention can be guided by this experience. A single blade screw conveyor is preferred, particularly for systems of considerable length as where the screw conveying regions and extraction zone are parts of one continuous conveying conduit. Under such circumstances, single screw conveyors are more practical than double or twin screw conveyors which have two parallel helical screw blades in intermeshing relationship and are prone to developing interference or jamming between the blades during rotation when of substantial length; i.e., with an LID ratio much greater than about 40:1. However, where relatively short length conveyor sections are permissible, twin-bladed screw conveyors can be used. For example, an extraction vessel mounted on a vertical axis could be conveniently associated with twin-bladed feed and discharge conveyor sections which could then be of sufficiently short length to be practicable.

As the prior art number herein demonstrates, numerous systems utilizing various combinations of operative steps have been proposed for the treatment of miscella and solid residue resulting from the extraction in order to separate the solvent from the extracted oil or the solid residue and to recover the solvent for recirculation and reuse for further extraction. The basic operations involved here are evaporation or volatilization of the solvent from the higher boiling extracted oil or the solid residue and the recompression and condensation to return the solvent vapors to liquid condition. In principle, the improvement described above relating to extraction, and in particular to continuous feeding of the raw solids to and from that zone, are independent of any specific manner of solvent separation and recovery and can be associated with any of these known proposals. However, a particularly energy efficient solvent separation and recovery system has been devised and serves as a secondary aspect of the invention preferably combined with the continuous extraction improvement.

This improved miscella handling system has three distinctive features. First, the miscella after removal from the extraction zone under the above specified mild conditions of temperature and pressure is subjected to a thermal phase splitting treatment, after being raised by a liquid pump to a near critical pressure and significantly elevated temperature which can also be near critical. At these conditions, the miscella naturally separates into a light solvent-heavy phase containing only a small amount of remaining oil, say of about 2% or so, which phase can be recycled directly to the extraction zone, preferably after giving up as much of its heat as possible to the oncoming miscella and undergoing a reduction in temperature and pressure to levels consistent with those needed for the extraction. An oil-enriched dense phase likewise separates which can then be subjected to further processing to separate remaining solvent. The thermal phase separating treatment is carried out entirely in the liquid state so that changes in state from liquid to gas and back, with consequential manifestation of the heats of Vaporization and condensation are avoided, significantly reducing energy consumption for this initial separation which can recover perhaps about 60-80% or more by weight of the solvent present in the miscella, dependent on the amount of oil originally present in the raw material. Perhaps 20-30% by weight of solvent is carried by the solids residue of the extraction with the balance going to the miscella. The compositions of the two liquid phases formed in the phase splitting treatment are fixed by the separation conditions, thereby altering the relative proportions of the two phases according to changes in the original oil content, less of the propane being recovered in the propane-heavy phase with increasing oil content.

Second, the oil-enriched dense phase from the thermal phase separation is subjected to two stages of preferably isothermal evaporation under progressively reduced pressures, and the solvent vapors from each such stage are recovered separately, with the respective sensible heats being preferably recovered and used at other points of the system. In this way, the compression load required for re-liquifying the respective solvent vapor fractions can be minimized by retaining a substantial fraction thereof for the first evaporation stage, at an intermediate level of pressure and only a minor fraction needing complete recompression to be restored to liquid condition.

Thus, of the solvent carried to the first stage heaterevaporator, equal to perhaps 10-20% of the total solvent, about 50-65% solvent is vaporized under the intermediate stage pressure, say 60-100 psi. In the second stage heater-evaporator, about 90% of the remaining 10% or so of total solvent there present is evaporated. Ultimately speaking then, not more than about 10% of the total solvent has to be recompressed over the full range or 100-200 psi to achieve extraction pressure levels. Significantly less energy is required for compression from about 70 psi up to about 200 than from atmospheric to 200 psi.

Third, the residual solids leaving the extraction zone are desolventized in at least two stages of progressively reduced pressure with the respective solvent vapors being collected separately. This achieves the same advantages as the multi-stage evaporation; namely, in retaining a higher pressure of a major part of the recovered vapors while minimizing the fraction of solvent undergoing the complete decompression and hence requiring full recompression for reuse in extraction.

DETAILED DESCRIPTION OF ILLUSTRATIVE EMBODIMENT

Figure 1:
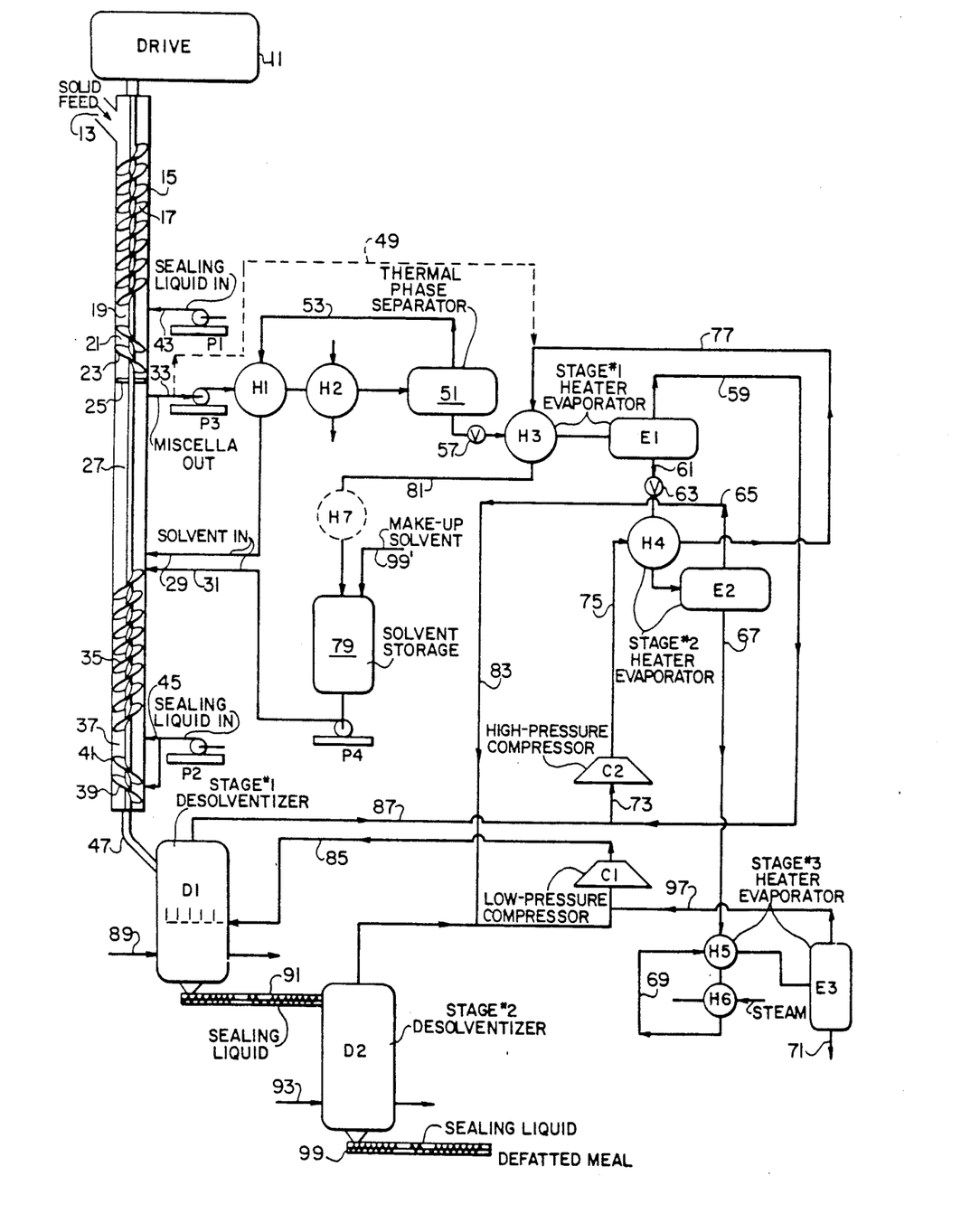

There is depicted in the accompanying drawing a preferred illustrative embodiment of a combined extraction and solvent separation and recovery system incorporating all of the features of the invention and represented in simplified diagrammatic style. This embodiment employs a continuous elongated helical screw conveyor arranged on a vertical axis, which conveyor is powered by a drive designated 11. The comminuted vegetable matter (raw material) is supplied through an inclined feed opening 13 near the top of the conveyor and falls into a screw conveyor feeding section 15 consisting of several conveyor flights or segments in which the helical blade or ribbon thereof has a forward pitch as at 17. The feeding section is followed by an open region indicated at 19, equivalent in length, to about 0.3-2.0, preferably 0.5-1.0 diameter of the conveyor, although this can be altered to some extent, disregarding the presence of any continuous conveyor shaft. This open space 19 serves as a compaction zone wherein the comminuted matter advanced by the feed conveyor section 15 is subjected to compaction pressure imposed thereon by a reverse feeding conveyor section 21 constituted of at least one or up to about three conveyor flights having the blade thereof of reversed pitch for feeding the raw material backwardly. The radius of the reversely directed conveyor blade is reduced slightly, say by about 10%, to provide an annular clearance space between the peripheral edge thereof and the conveyor wall and indicated at 23. Under the force of the oncoming raw material advanced by the conveyor feed section 15, the compacted material in compaction zone 19 is eventually forced to pass through the clearance space 23 and downwardly past the reverse feeding section 21. Preferably, the reverse feeding section is succeeded immediately by some means for breaking up the now compacted raw material to render it more susceptible to efficient extraction; and this means can take the form of transverse agitator arms 25 or, alternatively, a short length, say one to two flights, of a forwardly pitched screw conveyor similar to feed conveyor section 15. The relative proportions and configuration of the screw section in the drawing are, of course, considerably exaggerated.

Next, is an extended open region 27 which constitutes the extraction zone, the length of such region being selected in relation to its diameter as to provide the desired residence time for the material being extracted as the same gravitates downwardly under its own weight. At the downstream or lower end of the extraction zone 27, pressurized extraction solvent, preferably propane, is admitted; and in the illustrative embodiment, the solvent is admitted in two separate fractions, a first fraction containing a small amount up to about 2% of residual oil and a second essentially oil-free fraction. Because the material being extracted should be contacted with solvent of greatest purity at the last point in the extraction, relative to the raw material flow direction, these two fractions are introduced at axially separate points, the less pure oil containing fraction at 29 and the essentially pure fraction slightly downstream thereof at 31. At the upstream or upper end of zone 27 a miscella of solvent with dissolved extracted oil is removed at 33. Extraction zone 27 is followed by a forwardly feeding discharge conveyor section 35 constituted of several flights of screw conveyor having forwardly pitched blades similar to the forward feeding section 15, section 35 terminating in an open conveyor region similar to open section 19 for creating a similar compaction zone adjacent the discharge end of the overall conveyor. As before, at the low end of the compaction zone 37 is a reverse feeding conveyor section 39 of one or two flights having backwardly inclined blades similar to reverse section 21, and the blades in the reverse section are likewise of slightly reduced radial dimension to form an annular clearance passage 41 thereabout for eventual passage therethrough of the now extracted solid matter.

A port 43 is made in the wall of the feeding conveyor section at a point within the open compaction zone 19 thereof, and this port is connected to a pump P1 taking a normally liquid sealing medium from a suitable supply source thereof (not shown) and injecting it into the open zone under sufficient pressure so that the raw matter in the compaction zone can become intimately admixed with the thus admitted liquid sealing medium and become converted to a stiff dough-like plastic condition. Thorough admixture can be promoted by admitting the sealing medium through multiple peripherally spaced ports, or by providing an agitator arm on the shaft within this zone, or perhaps admitting the medium just upstream of the beginning of the zone. Usually, however, the solid matter in the compaction zone receives enough shearing contact from the contiguous blade surfaces as to become sufficiently mixed with the medium.

Similarly, entry port 45 is provided in the wall of the discharge conveyor section within the open region 37 for admission into this region of normally liquid sealing medium which can be the same or different as the sealing medium used in the compaction zone 19 at the feeding end of the system. Here again, the sealing medium is delivered by a pump P2 taking the medium from a suitable supply source, not shown, and injecting it under pressure.

The extracted solid residue passing through the reverse feeding part of the discharge conveyor section can be broken up into more open condition conducive to more efficient desolventizing in the same fashion as at the feeding end of the system, if desired; but this is less important for the discharge end inasmuch as the residual solvent carried in the solid residue leaving the unit naturally undergoes expansion, with consequential opening of the solid matter, when subsequently exposed to reduced pressure during desolventization. Thus, the discharge conveyor can empty directly into an outlet conduit 47 which dumps into the first stage of a desolventizing unit having preferably two stages to receive the solvent which wets the solids residue and amounts to about 20-30% by weight of total solvent.

As the extraction proceeds in the extraction zone 27, the raw solids migrate therethrough (downwardly in the drawings), while the solvent passes ordinarily in countercurrent flow relation thereof (upwardly), dissolving oil from the gravitation solids and becoming increasingly enriched with such oil. At the beginning end of extraction zone 27 (its upper end), just downstream of the feed conveyor section including the agitating device 25, the miscella is removed through a conduit 33. For a typical rice bran extraction, the miscella might contain 16-39% by weight extracted oil and the balance solvent; although this ratio will depend upon the particular oil content of the raw vegetable matter undergoing extraction which can vary widely. Although the utilization of an energy recovering loop achieving thermal phase separation is a preferred adjunct of the recovery aspect of the invention, this is optional; and in such case, the miscella can be delivered directly to a heater-evaporator unit described later, and this optional route for the miscella is indicated by dashed line 49. Ideally, however, advantage is taken of the energy saving loop; and for this purpose the pressure of the miscella is raised by pump P3 to near the critical pressure for the specific solvent. The preferred solvent being propane and assuming extraction at room temperature at a pressure in the range of about 125-200 psi, 200 psi being most preferred, pump P3 would raise the miscella pressure to about 600 psi, the miscella, of course, continuing in its liquified condition prevailing during the extraction. The high pressure miscella is then heated to raise its temperature to near critical and preferably as much of the heat needed to this end as possible is extracted from a high solvent light phase resulting from the thermal phase separation by means of heat exchanger H1. The heat recovered in this fashion must be supplemented to achieve near critical temperature, and this is supplied by a subsequent heat exchange H2 in which the miscella flows in heat exchange relation with a heated fluid; e.g., steam, or heated electrically to achieve a temperature of 190°-200° F., more usually 190°-195° F., and an ultimate pressure of around 600-610 psi. The miscella at near critical condition passes next to a thermal phase splitting vessel 51 wherein a phase separation takes place under the selected conditions, yielding a high solvent light phase, containing 98% or so solvent and the remainder 2% oil. This light phase is liquid and is recycled through line 53 to heat exchange H1 to give up, as mentioned, a substantial measure of its sensible heat to oncoming miscella. Phase equilibrium tables and corresponding diagrams can be easily obtained experimentally for propane and butane, as contemplated here, and precise combinations of near critical temperature and pressure consistent with the desired phase separation can be selected from these data.

An oil-enriched heavy phase also results from separator 51, consisting of say 60% solvent and 40% oil, and this phase is passed via line 55 through a pressure reducing valve 57 to reduce its pressure to about 50-100 psi, preferably 60 psi, and then delivered to a combined heater-evaporator which preferably operates isothermally. The heater part of this combination is represented by heat exchanger H3 wherein the de-pressurized heavy phase passes in heat exchange relation with a suitable heating medium at about room temperature, preferably recompressed solvent recovered from a subsequent stage. Heat exchanger H3 adds sufficient heat to at least offset the chilling effect that is experienced by the solvent in undergoing its pressure reduction in valve 57 and maintain the desired temperature. Solvent vapor at say 60 psi is taken off the top of evaporator E1 in line 59; while an oil phase containing perhaps 10% or less propane is removed from the bottom thereof at 61, passing through a pressure reducing valve 63 to reduce its pressure to about one atmosphere. The evaporator could be adiabatic if preferred.

The de-pressurized mixture containing mainly oil at this point is then subjected to a second combined heater-evaporator stage wherein the heater side is represented by H4 and the evaporator side by E2, the second stage also preferably proceeding isothermally. . In exchanger H4, the mixture is reheated again to make up for chilling effect of the loss of the heat of vaporization by expansion in valve 63 and preferably this heat is again extracted from a recycled recompressed solvent phase derived from a later stage. In any case, the mixture experiences a second stage evaporation in evaporator E2, with the solvent vapors taken therefrom via line 65 at the top at one atmosphere pressure and at near room temperature. From the bottom of the evaporator E2 by line 67 is removed oil containing any residue of solvent which is preferably minimal and not more than around 1-2%. Both propane and butane are accepted for use in association with foods for human consumption without deleterious effects so that the presence of small residues of such solvents is permissible.

However, if further reduction in the residual solvent content in the recovered oil is indicated to achieve essentially pure oil, then a third combined heater-evaporator stage can be employed as shown at the lower right corner of the drawing. In the third stage, the oil is delivered by line 67 to a heat exchanger H5 to be heated to a temperature sufficiently high, say up to 200° F., to insure escape of the solvent under one atmosphere pressure in the third stage evaporator E3, heat exchanger H5 being supplied with heat exchange medium moving in a closed loop 69 through heat exchanger H6 against, e.g., steam. Virtually 100% pure oil can be recovered from the bottom of evaporator E3 at 71.

The solvent vapor from first stage evaporator E1 is recovered under the pressure of about 60 psi and recycled by line 73 to a high pressure compressor C2 to undergo compression to about 125 psi, consistent with liquifaction upon subsequent removal of heat and lowering of temperature. The sensible heat content of the compressed solvent is desirably given up first to the high oil dense phase from first stage evaporator E1 in the second stage heat exchanger H4 through line 75 and, second, to the oil-enriched miscella phase from the thermal phase separator 45 in the first stage heat exchanger H3 through line 77 before being delivered to solvent storage tank 79 by line 81. If needed to insure condensation prior to storage, the recycled solvent can be cooled further in an optional heat exchanger H7 against, for example, tap water.

The solvent vapors from second stage evaporator E2 are recycled by line 83 for preliminary low pressure compression from atmospheric to 60 psi in the low pressure compressor C1, and the sensible heat therein following such compression can advantageously be used for heating the collected solids residue during desolventization. To this end, such vapors are passed via line 85 to the interior of the first stage desolventizer D1 to become commingled with residual solvent vaporized therein, the commingled low pressure vapors being then ready by way of line 87 for high pressure compression in the high pressure compressor C2 together with the high pressure vapors recycled by line 59 from first stage evaporator E1.

The flashing off of the residual solvent from the solids residue in the first stage desolventizer D1 may cause cooling of the residue which should be compensated for by supplying heat to the same from a suitable medium at 89, and ground water is again suitable for this purpose. The solids residue from first stage desolventizer D1 is under a certain intermediate pressure in the range of 50 to 100 psi, say about 60 psi, the same as for the first stage heater-evaporator, and leaves through an additional screw conveyor 91, which for containing the intermediate pressure of desolventizer D1 can be equipped for achieving a compaction zone with introduced sealing medium as before. This conveyor 91 empties into the second stage desolventizer D2 under one atmosphere pressure, again being supplied with make-up heat from a medium such as tap water introduced therein at 93. The additional solvent vapors flashed off in desolventizer D2 at ambient pressure are taken off at 95 and recycled to the inlet of the low pressure compressor C1, after being combined with the vapors collected by line 83 at ambient pressure from the second stage evaporator E2 as well as those from the optional third stage evaporator E3 by a line 97.

A small loss in solvent may very well take place in the system described above, notwithstanding the various measures adopted therein for maximizing solvent recovery and minimizing overall energy consumption. Make-up solvent, as needed, may be supplied to solvent storage tank 79 by line 99' to maintain the full amount of solvent in the system. The solvent in storage tank 79 is essentially 100% pure and is recycled to the extreme downstream end of the extraction zone by means of pump P4 and line 31.

The assembly of helical screw conveyors is well known in that art and does not form any real part of the present concept. Such conveyors are generally composed of a number of axial segments or flights in axial serial relation, and such flights are available in a considerable range of diameters according to the size of the conveyor as well as in a considerable range of pitches; i.e., the effective angle of inclination of the helical blade. The length of the segments can also range from a semi-flight; i.e., a fraction of a revolution to several flights making plural revolutions, a single flight being taken as the axial distance separating two aligned points on the blade periphery between which the blade makes a complete 360° revolution. Usually, a number of such flights and/or semi-flights are stacked onto a common driving shaft, to which they are mechanically keyed for positive drive, with the adjacent end edges of blades of the contiguous flights being fitted in alignment or abutment so as to form an essentially continuous helical surface. It is preferred that the conveyor sections begin with flights of larger pitch with the pitch being reduced in successive flights, or groups of semi-flights, prior to the compaction zone in order to subject the raw material to a preliminary de-aeration by the squeezing action of the reduced pitch sections before being projected into the compaction zone, and such pitch reduction can be progressive between the initial feeding point and the compaction zone. Similarly, the pitch of the flights of the reverse feed conveyor region can have about the same pitch, but in the opposite direction, as that immediately upstream of the compaction zone.

Generally, the quantity of injected sealing medium should be about the minimum, without the already identified operative range, at which an effective seal for the prevailing factor particularly where the sealing medium is a recycled extraction pressure is achieved with a reasonable added safety fraction of the recovered oil as is preferred. This reduces the burden on the extraction solvent as well as minimizing the size of the fraction that has to be recycled for sealing purposes. Thus, the sealing medium can be conveniently utilized at a 3-4% level at least in the case of rice bran.

A typical residence time for rice bran extraction is about 15-20 minutes with a minimum time of about 10 minutes, for a generally acceptable level of hexane-extractable liquids, including phospholipids, in the recovered solids of not more than 2% by weight. With longer residence times, extraction effectiveness increases with decreasing lipids remaining in the recovered de-fatted solids down to about 0.5 by weight of solids. Extraction efficiency, and thus the duration of the extraction, are influenced among other things by the particle size of the raw material being processed. Extraction efficiency appears to increase as the particle size of the material is made finer; and, therefore, the raw material is preferably ground to finely divided form, say small enough to pass an 80 mesh screen, preferably 50 mesh, prior to processing if not already of suitable size. Unless the particle size is sufficiently small to rupture the oil-containing cells in the vegetable matter, extraction times can be significantly prolonged. As normally milled, the particle size of rice bran is well suited for extraction.

EXAMPLE 1

In order to demonstrate the practical effectiveness of the compaction plastification principle to the present invention, experiments were carried out with a laboratory size screw conveyor-extruder Model No. ZSK-30 manufactured by Werner & Pfleiderer Corp., Ramsey, N.J., having a standard screw diameter of 30 mm, and constituted of co-rotating intermeshing twin helical screws. In this model, screw segments are stacked axially in keyed relation on a common shaft, and the upstream feeding section was constituted of the following standard conveyor elements in the specified order: 42/42 SK, 42/42 SK 42/21 SK N, 42/21, 28/28, 20/10, 20/10, 14/14, IGEL 14/7, 14/14/, 14/14, spacer ring/45, 20/10 LI(reverse feeding) and 42/42. The center plane of the spacer ring was located at an axial position along the length of the screw equal to 8D. When driven at 150 rpm and supplied with a heat stabilized rice bran, in which the heat was produced by extruder friction, and tested against a pressurized nitrogen atmosphere, simulating the pressure of an extraction zone, with water being added by a positive displacement pump at the spacer ring in the different amounts specified below as the sealing medium in a series of tests, the following results were obtained:

TABLE 1

| Water As Sealing Medium | |
|---|---|
| % by Weight of Sealing Medium | Level of Pressure Contained, psi |
| 4 | 220* |
| 7 | 490 |
| 12 | 160 |

*Some leakage was observed in this test evidenced by a slow drop in nitrogen pressure.

For comparison, a similar test was carried out with no sealing medium and with unsatisfactory results in that a pressure equivalent to the minimum liquifaction pressure for propane of 125 psi could not be contained.

A similar test was repeated using the same laboratory model except that the ring segment identified above was replaced with spacer ring/7 (of much reduced axial length) and with this change only a pressure of 200 psi could be obtained.

The same test was repeated except that the reverse segment 20/10 LI was omitted, the spacer ring being followed directly by a 42/42 segment. Under such conditions, the pressure containment was essentially zero.

EXAMPLE 2

Tests similar to the first set described in Example 1 were carried out with a competitive Leistritz laboratory, size screw conveyor extruder Model No. LSM 34.34 GL having co-rotating intermeshing twin screws with a screw diameter of 34 mm with a generally similar configuration of flight elements and spacer ring except that the length of the reverse feeding flight segment was doubled. Extracted rice oil was utilized as the sealing medium being introduced with a positive displacement pump into the open space defined by the spacer ring in selected quantity as specified. Extrusion heat-stabilized rice bran was fed to this machine with a screw rotational speed of 120 rpm and tested against nitrogen pressure to determine the level of pressure that could be contained. The following results were obtained:

TABLE 2

| Rice Oil as Sealing Medium | |
|---|---|
| % by Weight of Sealing Medium | Level of Pressure Contained, psi |
| 0 (control) | 0 |
| 2 | 120* |
| 4 | 380* |
| 5 | 430 |
| 7 | 460 |
| 10 | 240 |

*Some leakage was observed in these tests.

If a liquid sealing medium other than the preferred recycled fraction of the extracted oil itself is selected for introduction into the compaction zone of any of the screw conveyors of the present system, then measures will normally have to be taken to separate the same. Application of, e.g., water, to the discharge conveyor emptying the extraction zone involves only minimal modification since the water remains with the solids residue during desolventizing and thus with the residue or defatted meal leaving the final desolventizer D2 through the unloading conveyor 99. Given the quite low levels of any water thus added, its presence in the meal may be tolerable; if not, it can be removed by drying. Injection of water to seal the compaction zone upstream of extraction may be slightly more complicated, dependent on whether the water in such small amounts is adsorbed by the solids residue which is often relatively hydrophilic or some water is entrained in the miscella. The former case is obviously analogous to the use of water to seal the downstream compaction zone while in the latter case the water, being immiscible with the oil and solvent, can be separated by decantation or settling, preferably before the miscella is pressurized and heated for purposes of thermal phase splitting. The separation of other non-oil sealing media will naturally depend upon their individual properties relative to the solvent oil and solid residue, but useful techniques for their separation will be readily apparent to those knowledgeable in this field.

What is claimed is:

1. In a continuous method for extracting oil from communited oil-containing vegetable matter in which said vegetable matter is passed through a closed extraction zone in contact with a liquid extraction solvent medium wherein said extraction solvent medium is a normally gaseous hydrocarbon under a pressure in said extraction zone sufficient to liquify the same and up to about 250 psi, the improvement of continuously introducing said vegetable matter into said extraction zone for extraction therein by the steps comprising: advancing said vegetable matter through an elongated tubular screw-feeding zone communicating at its discharge end with one end of said extraction zone, subjecting said vegetable matter while within said screw-feeding zone to compacting pressure to create a region of compacted vegetable matter, and introducing under pressure into the compacted matter region for admixture with the compacted matter passing therethrough an innocuous normally liquid sealing medium, which if different from said oil is capable of being separated from the extracted oil, in an amount up to about 10% by weight of said compacted matter, and sufficient when mixed with the compacted matter to form the same into a generally plastic mass capable of sustaining the pressure in said extraction zone, the magnitude of said compacting pressure in the absence of said sealing medium being insufficient either to express said oil directly from said vegetable matter or to densify said matter to a solid dam of a density sufficient to contain the pressure in said extraction zone.

2. The method of claim 1 wherein the flow of said vegetable matter through said extraction zone is countercurrent to the flow of said extraction solvent medium.

3. The method of claim 1 wherein said vegetable matter is a cereal bran.

4. The method of claim 3 wherein said cereal bran is rice bran.

5. The method of claim 1 wherein said sealing medium is oil previously extracted from said vegetable matter.

6. The method of claim 5 wherein a miscella of extracted oil in said solvent is removed from said extraction zone and the extracted oil is separated from said solvent medium; and a fraction of the thus-separated oil is recycled and introduced into said region of compacted matter as said sealing medium.

7. The method of claim 1 including the steps of removing the residual vegetable matter after said extraction from said extraction zone through an additional elongated tubular screw-feeding zone communicating with said extraction zone, subjecting the residual matter to compacting pressure to create in said additional screw-feeding zone another region of compacted matter similar to that created in said first-mentioned screw-feeding zone and introducing into said another compacted region an innocuous normally liquid sealing medium which if different from the extracted oil is capable of being separated therefrom, in an amount up to about 10% by weight of the compacted matter in such region and effective to form said compacted matter into a dough-like plastic mass.

8. The method of claim 1 wherein said extraction zone is maintained at a temperature substantially below the critical temperature of the liquified hydrocarbon constituting said extraction solvent medium.

9. The method of claim 8 wherein said extraction zone is maintained under a temperature of up to about 50° C.

10. The method of claim 9 wherein said extraction zone is maintained at about ambient temperature.

11. The method of claim 8 including the steps of removing a miscella of extracted oil in said extraction solvent medium continuously from said extraction zone at the pressure and temperature maintained in said zone, subjecting said miscella to mechanical pressure to pressurize the same to near-critical pressure and heating the same to near-critical temperature for said solvent medium, said near-critical temperature and pressure being selected to cause thermal phase-splittings of said miscella whereby said miscella separates into a light liquid phase consisting substantially entirely of said solvent medium and a dense liquid phase of an oil-enriched miscella, separating said liquid liquid phase and passing the same in heat exchange relation with fresh miscella subsequently removed from said extraction zone to transfer heat from said light phase to said subsequently removed miscella to cool the former and heat the latter, expanding the cooled light phase to reduce the pressure thereof while maintaining its liquid phase condition, the pressure and temperature of said light phase after said cooling and expansion generally corresponding to that of said extraction solvent medium in said extraction zone, and recycling the thus-cooled and expanded light phase to said extraction zone to comprise said extraction solvent medium.

12. The method of claim 11 comprising applying supplemental heating to the subsequently recovered miscella after heat exchange with said light phase to elevate the temperature thereof to said near-critical level.

13. The method of claim 12 which further comprises the steps of subjecting the oil-enriched dense liquid phase to at least two stages of evaporation while expanding the same to descending levels of pressure reduced from that of the thermal phase splitting, the pressure of the last such evaporation stage being ambient, to separate at least two fractions of solvent medium vapors under corresponding levels of pressure, separately recovering said solvent medium vapor fractions, subjecting each such fraction under extra-ambient pressure to at least one stage of high pressure pressurization as needed to raise the pressure thereof approximately to the pressure of the extraction zone, subjecting the ambient pressure fraction to at least one stage of low pressure pressurization followed by at least one stage of high pressure pressurization to raise the pressure thereof from to approximately that of the extraction zone, cooling the thus-pressurized fractions to the temperature of the extraction zone and thereby liquifying the same, and recycling the thus-liquified solvent fractions for reuse as the solvent medium in subsequent extraction.

14. The method of claim 13 wherein each of said evaporation stages is isothermal.

15. The method of claim 13 wherein the ambient pressure vapor fraction is pressurized in said low pressure stage to a pressure substantially equal to the pressure of one of the fractions separated under extra-ambient pressure and is combined with said latter fraction for pressurization in said high pressure stage.

16. The method of claim 13 wherein each of the expanded vapor fractions is heated after its expansion and before its separation and the high pressure pressurized fraction is cooled by passing the same in heat-exchange relation with at least the vapor fraction expanded to ambient pressure in the last evaporation stage, whereby said latter fraction is heated.

17. The method of claim 16 wherein said high pressure pressurized fraction after passage in heat-exchange relation with said ambient pressure fraction, is passed in heat-exchange relation with the oil-enriched dense phase after the expansion thereof for the first evaporation stage, whereby the latter becomes heated and the former cooled.

18. The method of claim 13 wherein the high pressure pressurized fraction is passed in heat-exchange relation with the oil-enriched fraction after the initial expansion of the latter for the first evaporation stage, whereby the latter is heated and the former is cooled.

19. The method of claim 1 which further comprises removing the solids residue from said extraction zone wet with solvent medium and subjecting it to at least two desolventizing stages with expansion to descending levels of pressure reduced from that of the extraction zone, the last such desolventizing stage being at ambient pressure, to recover a corresponding number of separate fractions of solvent medium vapor at graduated lower pressures, subjecting each such extra-ambient pressure fraction to high pressure pressurization to raise its pressure as needed to that of the extraction zone, subjecting the ambient pressure fraction to low pressure pressurization and at least one stage of high pressure pressurization to elevate the pressure thereof to the extraction pressure, cooling the thus-pressurized fractions to the extraction temperature to liquify the same and recycling the resulting liquified solvent medium for reuse in subsequent extraction.

20. The method of claim 19 wherein the ambient pressure fraction is pressurized in said low pressure pressurization to substantially the same pressure as one extra-ambient pressure fraction before high pressure pressurization thereof and is combined with the latter for high pressure pressurization and cooling to liquid condition.

21. The method of claim 19 wherein the vapor fraction from the low pressure pressurization is passed through said residue in said first stage to heat the same and assist in removal of the liquid solvent medium present therein.

22. In a continuous method for extracting rice oil from rice bran in which said rice bran is passed through a closed extraction zone in contact with a liquid extraction solvent medium wherein said extraction medium is a normally gaseous hydrocarbon under a pressure in said zone sufficient to liquify the normally gaseous hydrocarbon, the improvement comprising continuously introducing said rice bran into said extraction zone for extraction thereby the steps of: advancing said rice bran through an elongated tubular screw-feeding zone communicating at its discharge end with one end of said extraction zone, subjecting said rice bran while within said screw-feeding zone to compacting pressure to create a region of compacted rice bran, and introducing under pressure into the compacted bran region for admixture with the compacted bran passing therethrough an innocuous normally liquid sealing medium, which if different from rice oil is capable of being separated from the extracted rice oil, in an amount up to about 10% by weight of said compacted rice bran and sufficient when mixed with said compacted bran to form the same into a generally plastic mass capable of sustaining the pressure in said extraction zone, the magnitude of said compacting pressure in the absence of said medium being insufficient either to express said rice oil directly from said rice bran or to densify said rice bran to a solid dam of a density sufficient to contain the pressure in said extraction chamber.

23. The method of claim 22, wherein the movement of said rice bran through said extraction zone is countercurrent to the movement of said extraction solvent medium.

24. The method of claim 22, which further comprises removing the rice residue from said extraction zone wet with solvent medium and subjecting the rice bran residue to at least two desolventizing stages with expansion to descending levels of pressure reduced below the pressure of the extraction zone, the last such desolventizing stage being at ambient pressure, to, recover a corresponding number of separate fraction of solvent medium vapor at graduated lower pressures, subjecting each such extraambient pressure fraction to high-pressure pressurization to raise its pressure as needed to that of the extraction zone, subjecting the ambient pressure fraction to low-pressure pressurization and at least one stage of high-pressure pressurization to elevate the pressure thereof to the extraction pressure, cooling the thus-pressurized fractions to the extraction temperature to liquify the same and recycling the resulting liquified solvent medium for reuse in subsequent extraction.

25. The method of claim 24, wherein the ambient pressure fraction is pressurized in said low-pressure pressurization to substantially the same pressure as one extra-ambient pressure fraction before high-pressure pressurization thereof, and is combined with the latter for high-pressurization and cooling to liquid condition.

26. The method of claim 24, wherein the vapor fraction from the low-pressure pressurization is passed through said residue in said first desolventizing stage to heat the same and assist in removal of the liquid solvent medium present therein.

27. The method of claim 22, wherein said normally gaseous hydrocarbon is propane.

28. The method of claim 27, wherein the movement of said rice bran through said extraction zone is countercurrent to the movement of said extraction solvent medium.

29. The method of claim 28, which further comprises removing the rice bran residue from said extraction zone wet with solvent medium and subjecting the rice bran residue to at least tow desolventizing stages with expansion to descending levels of pressure reduced less than the pressure of the extraction zone, the last such desolventing stage being at ambient pressure, to recover a corresponding number of separate fraction of propane vapor at graduated lower pressures, subjecting each such extra-ambient pressure fraction to high-pressure pressurization to raise its pressure as needed to that of the extraction zone, subjecting the ambient pressure fraction to low-pressure pressurization and at least one stage of high-pressure pressurization to elevate the pressure thereof to the extraction pressure, cooling the thus-pressurized fractions to the extraction temperature to liquify the same and recycle the resulting liquified propane for reuse in subsequent extraction.

30. The method of claim 29, wherein the ambient pressure fraction is pressurized in said low-pressure pressurization to substantially the same pressure as one extra-ambient pressure fraction before high-pressure pressurization, and is combined with the latter for high-pressurization and cooling to liquid condition.

31. The method of claim 30, wherein the vapor fraction from the low-pressure pressurization is passed through said residue in said first stage to heat the same and assist in removal of the liquid solvent present therein.

* * * * *